(12) United States Patent
Patoglu

(10) Patent No.: US 11,491,960 B2
(45) Date of Patent: Nov. 8, 2022

(54) FORCE-FEEDBACK BRAKE PEDAL SYSTEM

(71) Applicant: Sabanci Universitesi, Istanbul (TR)

(72) Inventor: Volkan Patoglu, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 237 days.

(21) Appl. No.: 16/587,094

(22) Filed: Sep. 30, 2019

(65) Prior Publication Data

US 2021/0094519 A1 Apr. 1, 2021

(51) Int. Cl.
*B60T 8/32* (2006.01)
*B60L 7/26* (2006.01)
*B60T 13/58* (2006.01)

(52) U.S. Cl.
CPC ............. *B60T 8/3255* (2013.01); *B60L 7/26* (2013.01); *B60T 13/586* (2013.01); *B60T 2270/60* (2013.01)

(58) Field of Classification Search
CPC ... B60T 8/3255; B60T 13/586; B60T 2270/60
See application file for complete search history.

(56) References Cited

U.S. PATENT DOCUMENTS

| | | | |
|---|---|---|---|
| 6,378,671 B1* | 4/2002 | Carlson | B62D 5/006 188/267.2 |
| 6,684,987 B2 | 2/2004 | Stachowski et al. | |
| 6,916,074 B2 | 7/2005 | Jung et al. | |
| 7,357,465 B2 | 4/2008 | Young et al. | |
| 7,748,792 B2 | 7/2010 | Crombez et al. | |
| 2004/0251095 A1* | 12/2004 | Simard | B60T 13/586 188/156 |
| 2011/0190934 A1* | 8/2011 | Reiland | B25J 9/1641 700/258 |
| 2011/0304198 A1* | 12/2011 | Cottrell, V | B60T 1/10 303/2 |
| 2015/0035349 A1* | 2/2015 | Watanabe | B60T 7/06 303/3 |
| 2015/0141200 A1* | 5/2015 | Murray | A63B 22/0087 482/5 |
| 2015/0224970 A1* | 8/2015 | Yasui | B60T 8/172 701/74 |
| 2017/0028977 A1* | 2/2017 | Duff | G07C 5/0825 |
| 2017/0174189 A1* | 6/2017 | Richards | G05G 1/38 |
| 2018/0043865 A1* | 2/2018 | Pennala | B60T 7/06 |

* cited by examiner

*Primary Examiner* — Melody M Burch
(74) *Attorney, Agent, or Firm* — Bayramoglu Law Offices LLC

(57) ABSTRACT

A force-feedback brake pedal system for cooperative braking of an electric or hybrid vehicle having jointly a regenerative braking system and a frictional braking system includes a brake pedal which is pivotally mounted around a shaft or a bearing, an electronic circuitry which is in electrical communication with the regenerative braking system and the frictional braking system of the vehicle, an actuator for providing force feedback in accordance with the regenerative breaking and friction breaking of the vehicle, the actuator is in mechanical communication with the brake pedal. The force-feedback brake pedal system further includes a compliant element arranged between the brake pedal and the actuator, and a position sensor which, during operation, measuring the deflections of the compliant element and transmitting data to the electronic circuitry.

10 Claims, 8 Drawing Sheets

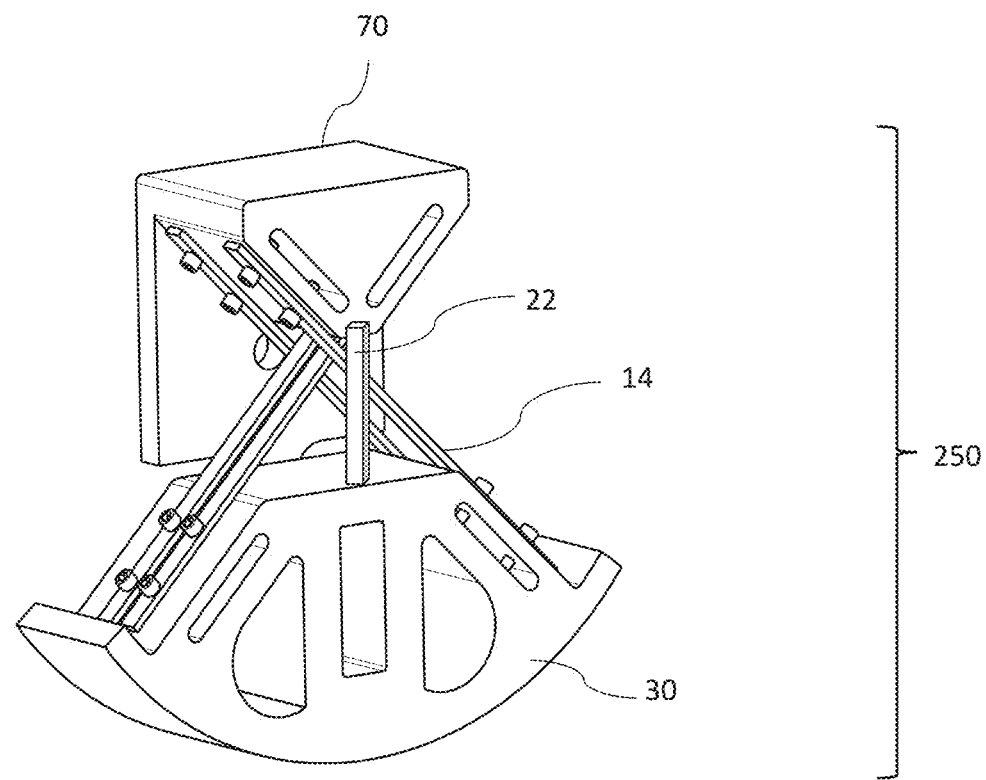
FIG.5
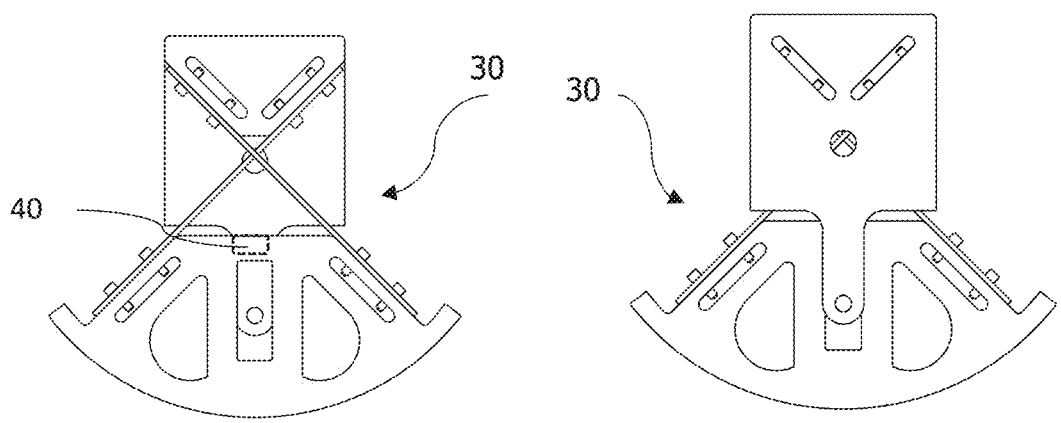
FIG.6A  FIG.6B

FORCE-FEEDBACK BRAKE PEDAL SYSTEM

TECHNICAL FIELD

The present invention relates to a brake pedal mechanism for an electric vehicle having combined regenerative braking system and frictional braking system. More particularly, the present invention proposes a force-feedback brake pedal for preserving the conventional brake pedal feel for improving safety and driver experience.

BACKGROUND

In vehicles equipped with electrical drive units (e.g., electrical or hybrid vehicles), electrical motors can also be employed to slow down the vehicle. In particular, during regenerative braking, the electrical motor is used as a generator, converting the kinetic energy of the vehicle into electrical energy to be stored in the battery pack instead of dissipating that energy through conventional frictional braking. Proper use of regenerative braking is crucial to improve efficiency and to extend the range of electric and hybrid vehicles. Furthermore regenerative braking is commonly employed by electrical and hybrid vehicles in order to significantly improve their energy efficiency and help them meet emission standards.

The methods used to blend friction braking with regenerative braking can be loosely categorized into two main approaches as parallel and cooperative regenerative braking. During parallel braking, conventional friction brakes are always in use, while regenerative braking is used to augment them when there is demand for further deceleration and sufficient regenerative braking force is available. While parallel braking is relatively easier to implement, this approach lacks power efficiency due to its generous use of friction brakes.

Cooperative braking is a commonly used approach during which the regenerative braking is utilized as much as possible in order to provide the demanded deceleration, while simultaneously charging the battery pack.

While regenerative braking is crucial for power efficiency, its utilization is challenging since the regenerative braking force is a nonlinear function of the vehicle speed and constrained by the size of the electrical motor as well as the amount of charge that the battery pack can accept at any given instant. For instance, in general, regenerative braking cannot be applied at very low and very high speed regions as sufficient braking forces cannot be generated at low speeds, while batteries cannot be charged at high speeds without causing permanent damage. Consequently, conventional friction brakes are still required to be employed together with regenerative braking to achieve safe deceleration.

In the prior art, it has been shown that cooperative braking can be very efficient and recover up to 50% more energy compared to alterative regenerative braking approaches. Hence, the automotive industry is moving towards the cooperative braking method.

Force feedback provided by the brake pedal is an important sensory feedback for the driver to ensure safe deceleration of the vehicle. Regenerative braking disturbs the conventional brake feel, as unlike the conventional hydraulic/electrohydraulic braking, there does not exist any physical coupling between the brake pedal and the regenerative brake force. Consequently, the pedal feel may be abruptly and nonlinearly affected when regenerative braking is applied. For instance, rapid softening/stiffening of brake pedal is commonly experienced when regenerative braking is activated or deactivated. This unfamiliar dynamics of the brake pedal is a safety-critical issue, as it negatively impacts driver performance and requires drivers to re-learn this non-intuitive braking pedal feel over long training periods.

In the prior art, it is known that several approaches have been proposed to achieve a smooth conventional brake pedal feel for cooperative regenerative brake systems. A prior art publication in the technical field of the present invention may be referred to as U.S. Pat. No. 7,357,465 among others, the document discloses passive approaches providing a pedal feel by utilizing various elastic and dissipation elements to implement pre-determined force-displacement relationship for the brake pedal. Further, another prior art, U.S. Pat. No. 6,916,074 discloses an adjustable damping implemented with magnetorheological fluids. While passive approaches are low-cost and simple, they can only be used for brake-by-wire systems, as they lack active force rendering capability or online adjustability to recover conventional brake feel when friction brake forces are reflected back to the driver through a physical connection. Another U.S. Pat. No. 6,684,987 discloses a motor-driven feedback mechanism for a braking pedal. The mechanism comprising: a pedal pivotally mounted to a frame via a shaft; a bi-directional motor capable of applying resistance to rotation and assistance to rotation of the pedal; a means for measuring at least one parameter of the pedal; a means for analyzing the at least one parameter of the pedal; and a means for controlling the bi-directional motor to adjust the direction and speed of the bi-directional motor in response to the at least one measured parameter of the pedal. However, in this patent application there is no mapping process between the pedal displacement and master cylinder to ensure the conventional brake demand. Moreover, this patent application has dramatic disadvantages since it requires a rigid connection between the pedal and actuator.

Additionally, U.S. Pat. No. 7,748,792 B2 discloses a brake-by-wire automotive braking system including a master cylinder connected to a number of wheel cylinders, with the master cylinder being actuated by a brake pedal assembly operatively connected with a master cylinder force simulator simulating the resistive force/displacement characteristics of the master cylinder itself. An electronically controlled compliance device selectively immobilizes the master cylinder force simulator so that the resistive force provided by the simulator may be applied selectively to the brake pedal. However, the braking system is only effective in the case of regenerative braking and fails to operate in the case of cooperative braking system.

Accordingly, it is desirable to further improve high fidelity force control performance and provide adjustable brake pedal feel for different vehicle settings in electrical and hybrid vehicles.

SUMMARY

Primary object of the present invention is to eliminate the above-mentioned shortcomings in the present state of the art.

Another object of the present invention is to provide a force-feedback brake pedal system to preserve the conventional brake pedal feeling during cooperative regenerating braking.

Another object of the present invention is to provide a force-feedback brake pedal system to ensure robust and high-fidelity force control at a low cost.

A further object of the present invention is to provide a force-feedback brake pedal system to compensate for the disturbing effects of regenerative braking and to recover a natural brake pedal feel.

Other objects of the present invention will become apparent from the accompanying drawings, brief descriptions of which follow in the next section as well as appended claims.

The present invention proposes a force-feedback brake pedal system mainly comprising a brake pedal which is pivotally mounted around a shaft or a bearing, an electronic circuitry which is in electrical communication with the regenerative braking system and the frictional braking system of said vehicle, an actuator for providing force feedback in accordance with the regenerative braking of the vehicle, said actuator being in mechanical communication with the brake pedal, wherein the brake pedal system further comprises a compliant element arranged between the brake pedal and the actuator, and a linear or rotary displacement or deflection sensor which, during operation, measures the deflections of the compliant element and transmits data to said electronic circuitry.

In a possible embodiment, the compliant element is in series with the actuator that may be named as series elastic actuator (SEA). Brake pedal with SEA may be designed to be attached to conventional friction brake pedal in parallel, the mechanical coupling between the brake pedal and friction brakes may be maintained.

BRIEF DESCRIPTION OF THE DRAWINGS

Attached figures, brief explanation of which is herewith provided, are solely intended for providing a better understanding of the present invention and are as such not intended to define the scope of protection or the context in which said scope is to be interpreted in the absence of the description.

FIG. 5 illustrates an exemplary view of a compliant element in accordance with an embodiment of the present invention.

FIG. 6A illustrates an exemplary front view of a compliant element brake pedal in accordance with an embodiment of the present invention.

FIG. 6B illustrates an exemplary rear view of a compliant element brake pedal in accordance with an embodiment of the present invention.

DETAILED DESCRIPTION OF THE EMBODIMENTS

Figure 1:
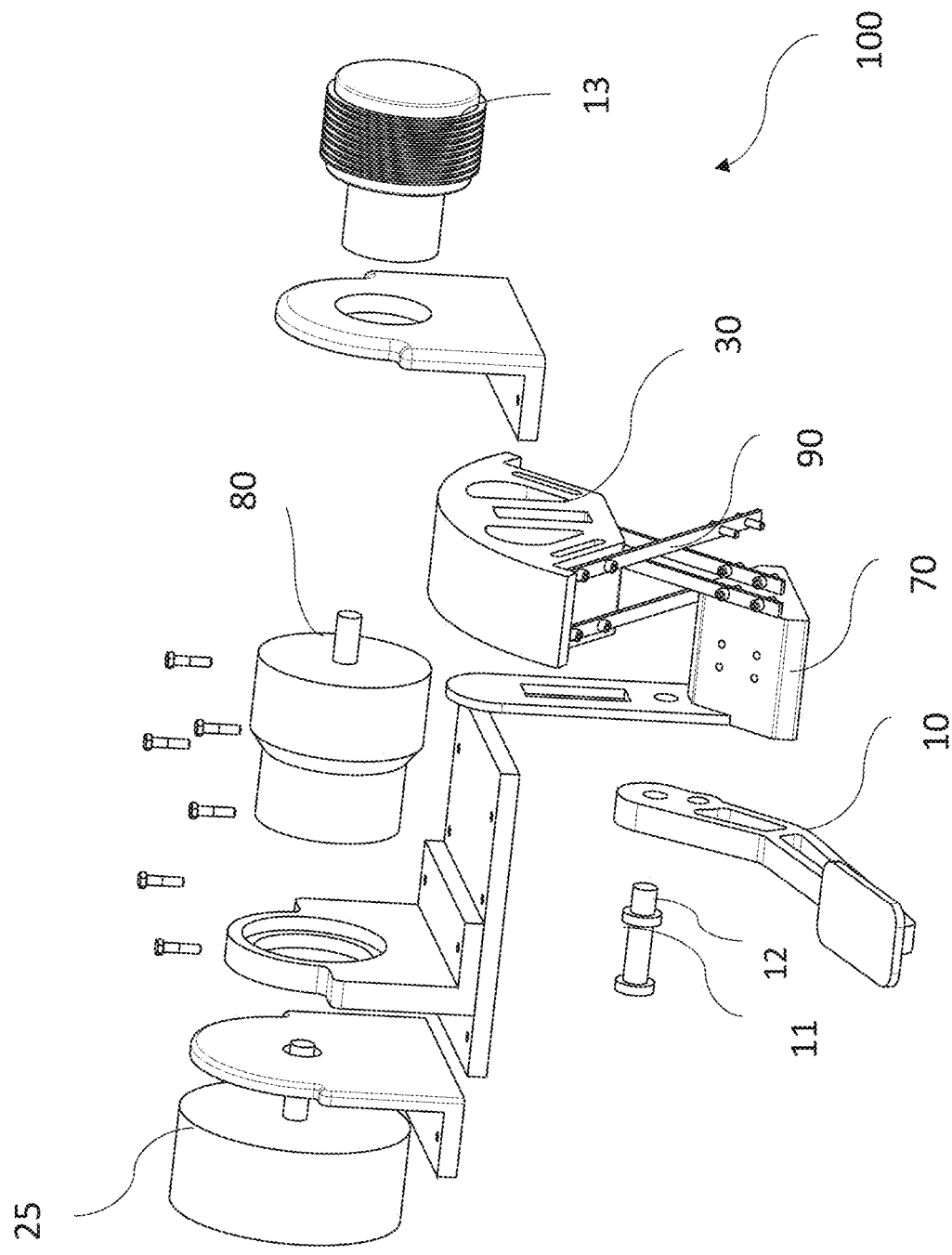
FIG. 1 illustrates an exploded view of a force-feedback pedal system in accordance with one embodiment of the present invention.
Figure 2:
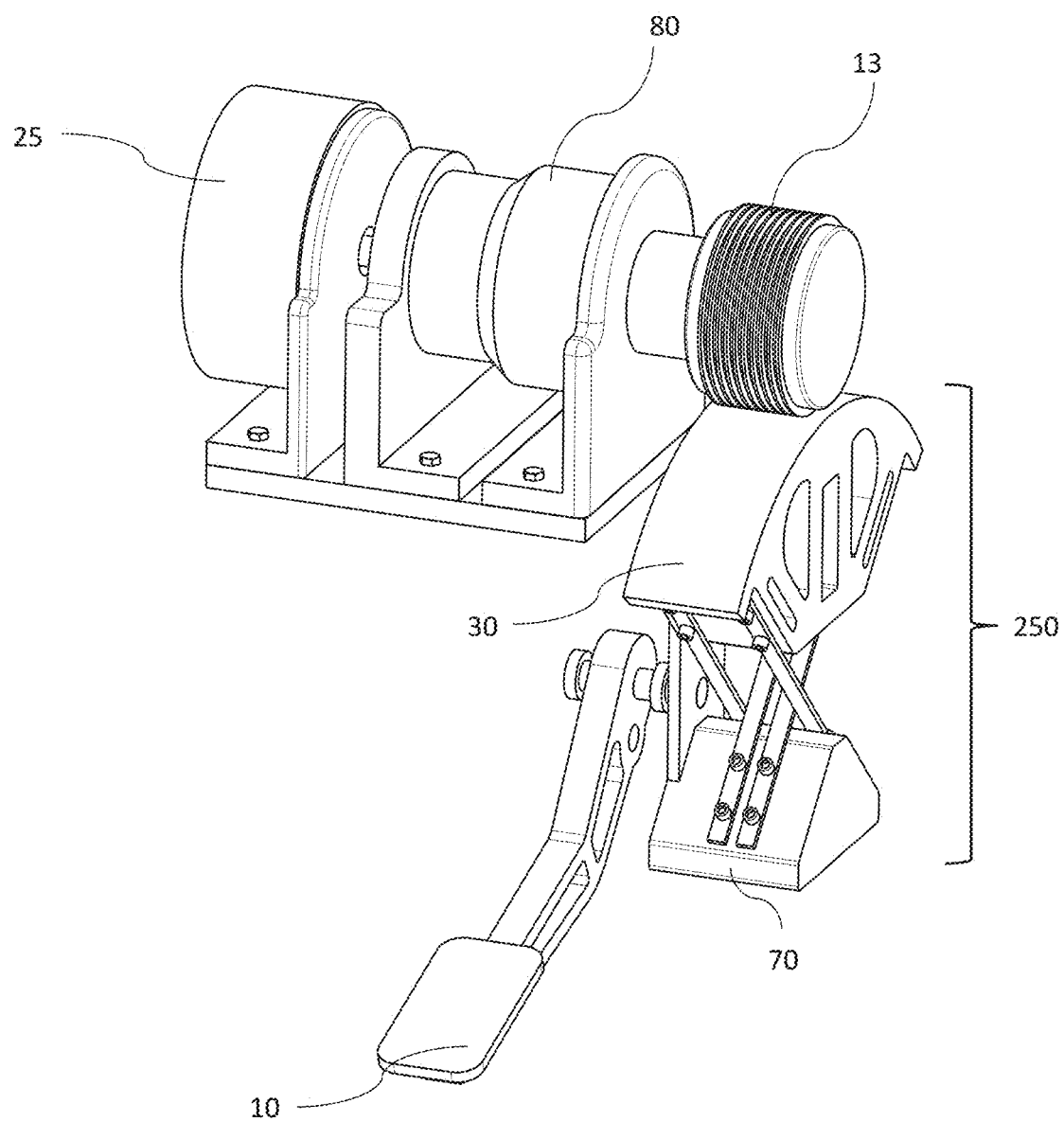
FIG. 2 illustrates a perspective view of a force-feedback pedal system in accordance with one embodiment of the present invention.

Hereinafter, preferred embodiments of the present invention will be described in detail with reference to the accompanying drawings which are given solely for the purpose of exemplifying embodiments according to the present invention. The list of reference numerals used in the appended drawings are as follows;

10. Brake pedal
11. Shaft
12. Bearing
13. Pulley, or pinion
14. Leaf spring
22. Linear encoder
25. Actuator
30. Sector pulley, capstan, or gear
35. Sensor
40. Position sensor
45. Encoder
70. Second end of the compliant element
80. Reduction element
90. Cross flexure joint
100. Force-feedback brake pedal system
150. Capstan transmission
250. Compliant element The invention proposes a force-feedback brake pedal system (100) for cooperative braking of an electric or hybrid vehicle, said vehicle having jointly a regenerative braking system and a frictional braking system, mainly comprising a brake pedal (10) which is pivotally mounted around a shaft (11) or a bearing, an electronic circuitry which is in electrical communication with the regenerative braking system and the frictional braking system of said vehicle and an actuator (25) for providing force feedback in accordance with the regenerative braking and friction braking of the vehicle, said actuator (25) being in mechanical communication with the brake pedal (10). The force-feedback brake pedal system (100) further comprises a compliant element (250) arranged between the brake pedal (10) and the actuator (25), and a position sensor (40) such as a linear or rotary displacement or deflection sensor which, during operation, measures the deflections of the compliant element (250) and transmits data to said electronic circuitry. Said compliant element (250) is in series with the actuator (25) which may conveniently be an electric motor.

In a possible embodiment, said force-feedback brake pedal system (100) can be implemented as a single degree of freedom force-feedback device with series elastic actuation (SEA). By using compliant elements (250) and deflection measurements with a sensor (40) for force estimation in a force control framework, SEA enables higher force-feedback controller gains to be utilized to achieve responsive, robust and stable force control. Brake pedal (10) with SEA also possesses favourable output impedance characteristics over the entire frequency spectrum. In particular, within the force control bandwidth of the device, SEA can ensure high fidelity force rendering and back drivability through active force control, that is, by modulating its output impedance to a desired level. Compared to load cell or other commercial force measuring based control approaches, brake pedal (10) with SEA employs orders of magnitude more compliant force sensing element and can be implement a lower costs.

Figure 3:
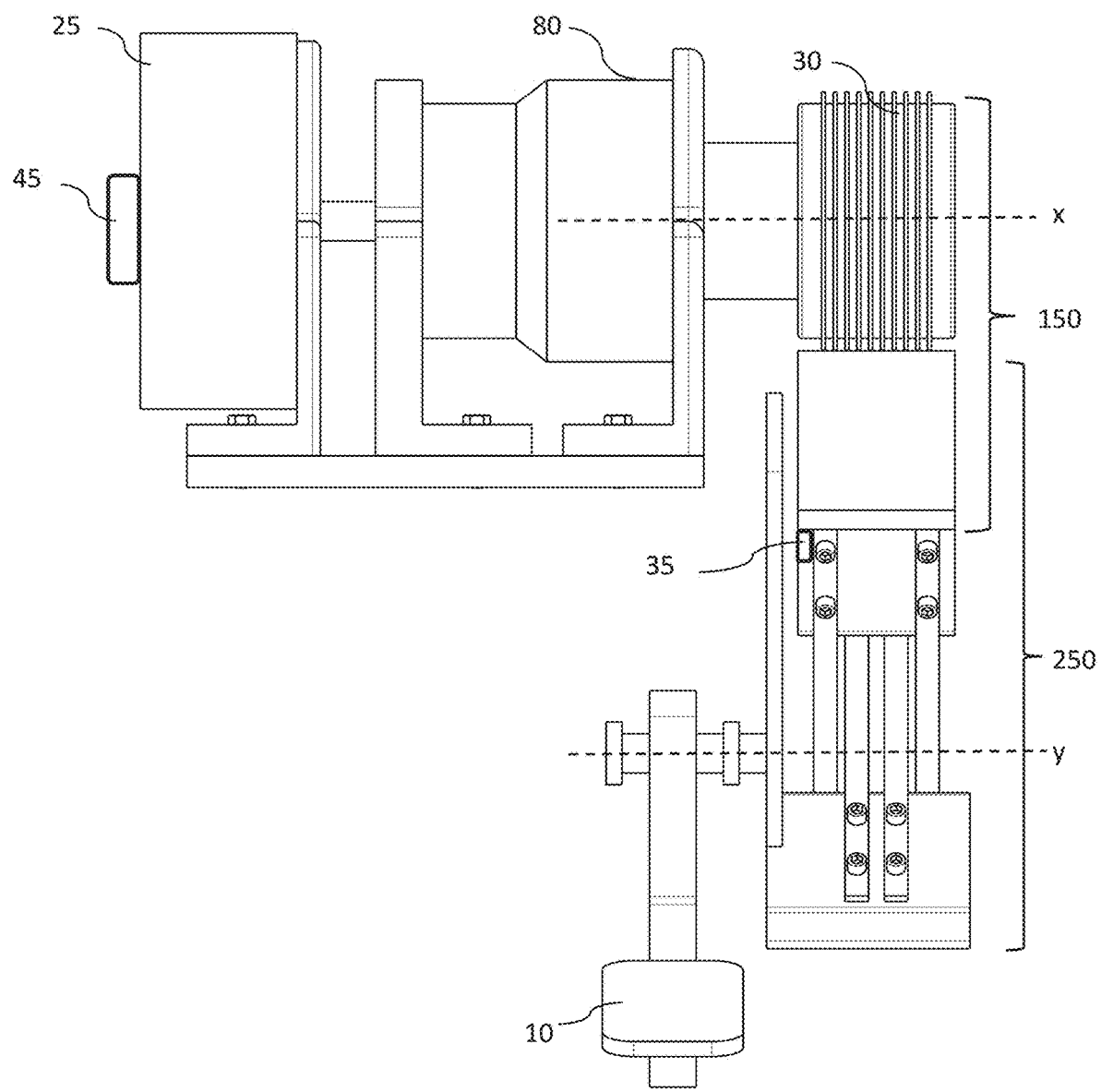
FIG. 3 shows an upper view of a force-feedback brake pedal system.

In one exemplary embodiment, the compliant element (250) is attached, at its first end, to the output shaft of the reduction mechanism via a capstan (30), a pulley (30) or a gear (30), and at its second end (70), fixedly attached to the brake pedal (10) as shown in FIG. 1. Capstan transmission provides low friction, which is a kind of rotary transmission elements that has relatively low inertia. The brake pedal (10) and the second end (70) of the compliant element (250) are rigidly attached to each other. The pulley (30) of FIG. 3 is actuated by an actuator (25) preferably via a reduction element (80). Once the pedal (10) is interacted the compliant element (250) having the leaf springs (14) deflects since the pulley (30) and the pedal (10) do not move in the same amount. A deflection sensor (35) measures this deflection whereas an encoder (45) senses the rotation of the actuator (25). The pedal (10) is rotatably connected to the compliant element (250) and has an axis of rotation (y) as illustrated in FIG. 3. A deflection sensor (35) measures the deflection occurring in between the two ends (30, 70) of the compliant element (250). The second end (70) of the compliant element (250) is rigidly attached to the pedal (10).

In other possible embodiment, said force-feedback brake pedal system (100) further comprises a encoder (45) for sensing the position of the actuator. In general, capstan transmission has two parts, a small pinion or pulley (13) and a large one such as sector pulley (30). In addition, the capstan transmission (150) not only helps improve the torque output, but also embeds the intentionally introduced compliant element (250) and a position sensor (40) to measure deflections of this leaf spring (14). Additionally, the compliant element (250) may be equipped with a position sensor (40) as a deflection sensor (35) such as a linear encoder (22) or with a hall-effect sensor or similar means for precisely sensing the deflections of the compliant element (250). A Hall-effect sensor may also be embedded in the compliant element (250). Compared to load cell or other commercial force measuring based control approaches, said force-feedback brake pedal system (100) employs orders of magnitude more compliant sensing by the means to measure force received from a master cylinder or the driver. Moreover, robust and low-cost force measuring can be implemented based on regular position sensing and custom built complaint springs (14). Advantageously, lower cost components can be utilized as actuators (25)/power transmission elements (80, 150) in the implementation of a said force-feedback brake pedal system (100) to achieve robust and high-fidelity force control.

According to another possible embodiment, said actuator (25) is a rotary electric motor having a primary rotation axis (x) as shown in FIG. 3. The force-feedback brake pedal system (100) may have a reduction mechanism (80) which is used for adjusting the rotational speed or output torque of the actuator (25) around said primary rotation axis (x) and which has an output shaft (11). Said rotary electric motor (25) is used to impose the motion of the brake pedal (10) under closed-loop control based on measurements from the pedal (10) wherein torque estimation is performed by measuring the deflections of the compliant element (250) and using Hooke's law. The pulley (13) and sector pulley (30) make up a transmission capstan (150). Preferably, for power transmission, a geared DC motor with large torque output capacity may be used to drive a capstan (150) transmission as shown in FIG. 3. Said capstan transmission (150) may comprise a pinion (13) attached to output shaft (11) of the actuator (25) and a bearing such as a driven sector pulley (13). In particular, the capstan transmission (150) not only helps improve the torque output, but also embeds the intentionally introduced compliant element (250) and a position sensor (40) to measure deflections of this compliant element. The actuator (25) is selected to include an optical encoder or other means of measuring deflection at the shaft (11).

In a possible embodiment, referring to FIG. 5 to FIG. 9, said compliant element (250) is configured as a cross-flexure pivot that can be formed by crossing two leaf springs (14) symmetrically. Said cross-flexure joint (90) is preferred as a part of the compliant element (250) of the SEA, since this type of compliant element is robust as it distributes stress over the leaf springs (14) and avoiding stress concentrations. The brake pedal (10) may be attached to the vehicle frame through a ball-bearing, and the sector pulley may be attached to the brake pedal through a cross-flexure joint (90). The centre of rotation of cross-flexure joint (90) is aligned with the rotational axis of the brake pedal (10) while the Hall-effect sensor is constrained to move between the magnets embedded in the sector pulley. Furthermore, an optical encoder (12) may also be employed to measure deflections of the cross flexure joint (150). Finally, the conventional friction brake pedals (10) already have a displacement sensor which acts as a redundant sensor that can be used to detect any failure that may take place at the encoder (45) on the actuator (25).

Figure 4:
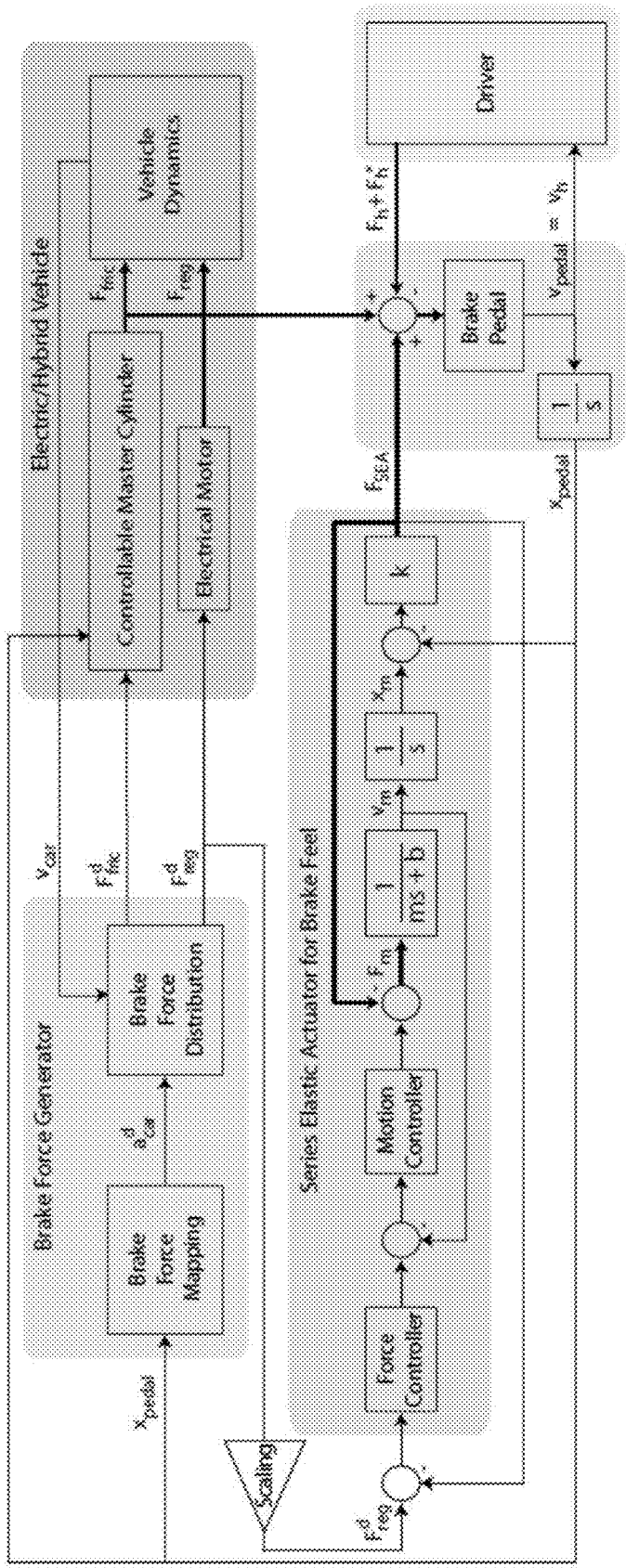
FIG. 4 shows a control block diagram of a force-feedback brake pedal system.
Figure 7:
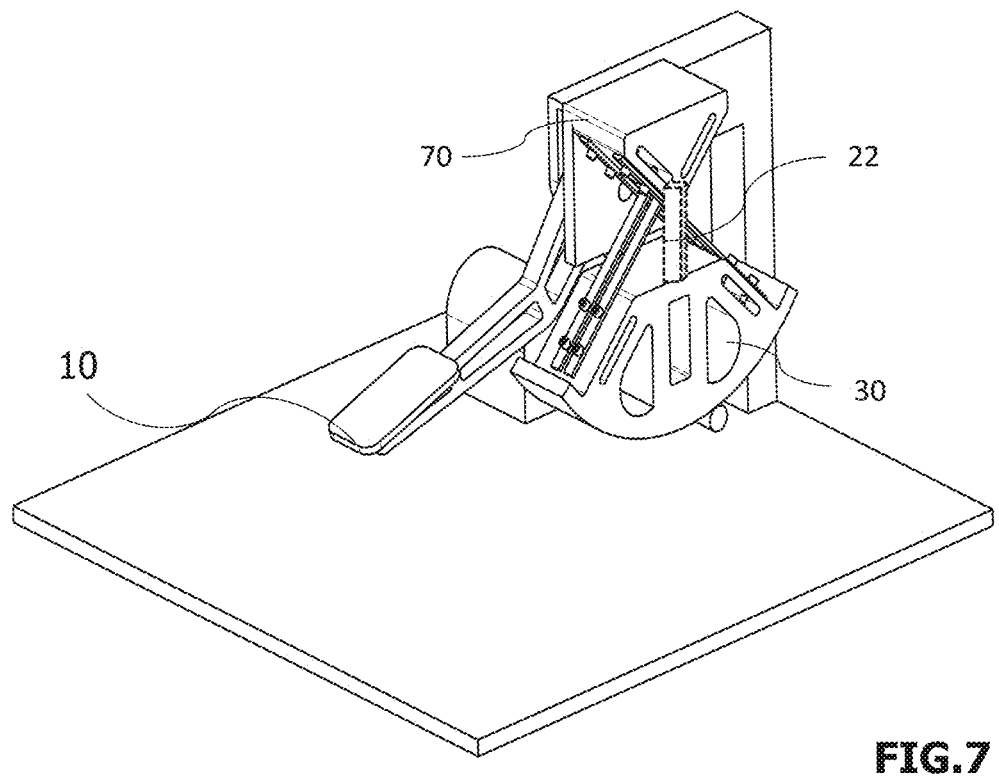
FIG. 7 shows a side perspective view of a compliant element in accordance with an embodiment of the present invention.
Figure 8:
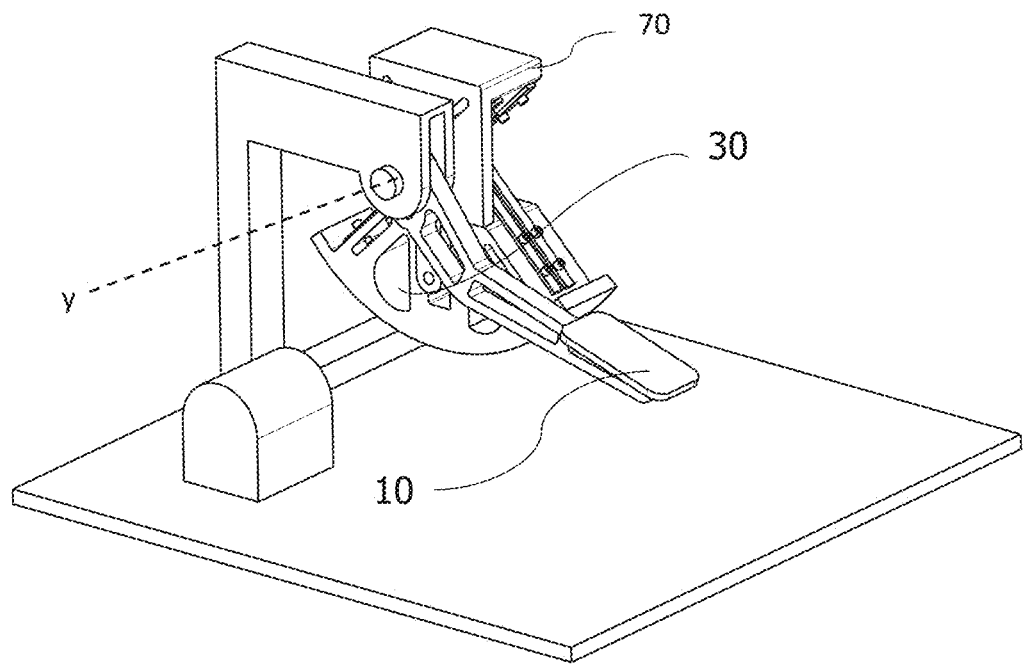
FIG. 8 shows another perspective view of a compliant element with leaf springs in accordance with an embodiment of the present invention.
Figure 9:
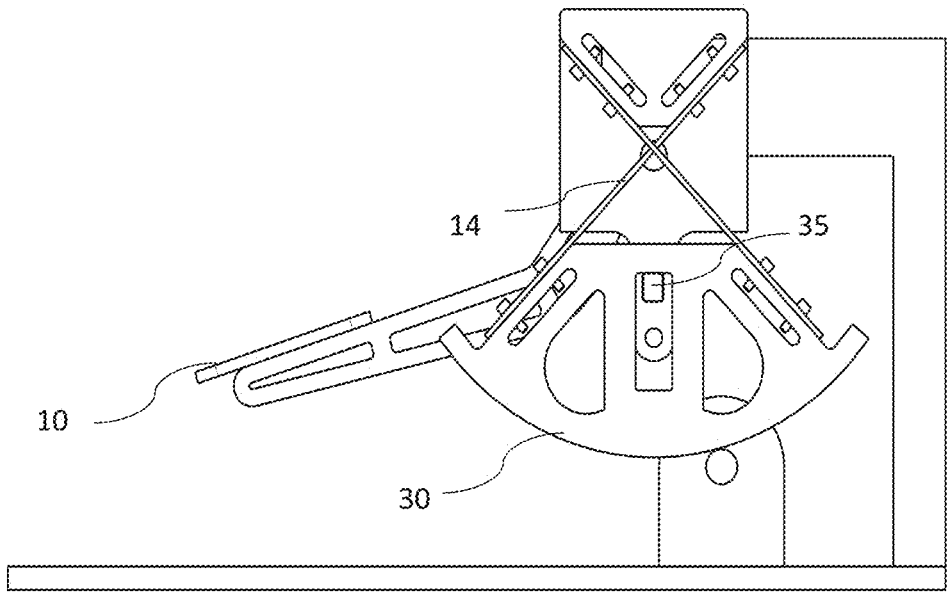
FIG. 9 illustrates a perspective view of shows another side view of a compliant element with leaf springs in accordance with another embodiment of the present invention.
Figure 10:
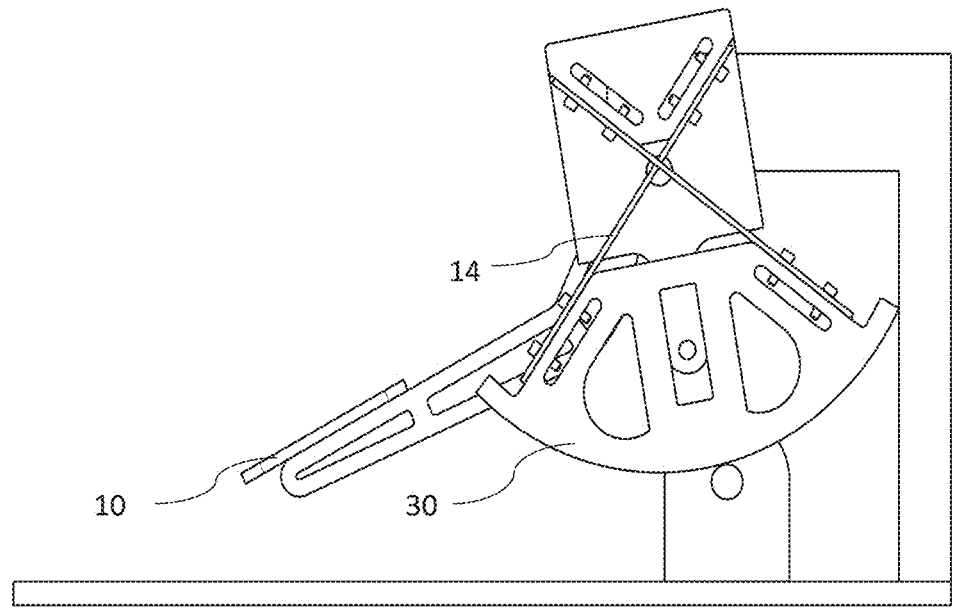
FIG. 10 illustrates a brake pedal according to the present invention.
Figure 11:
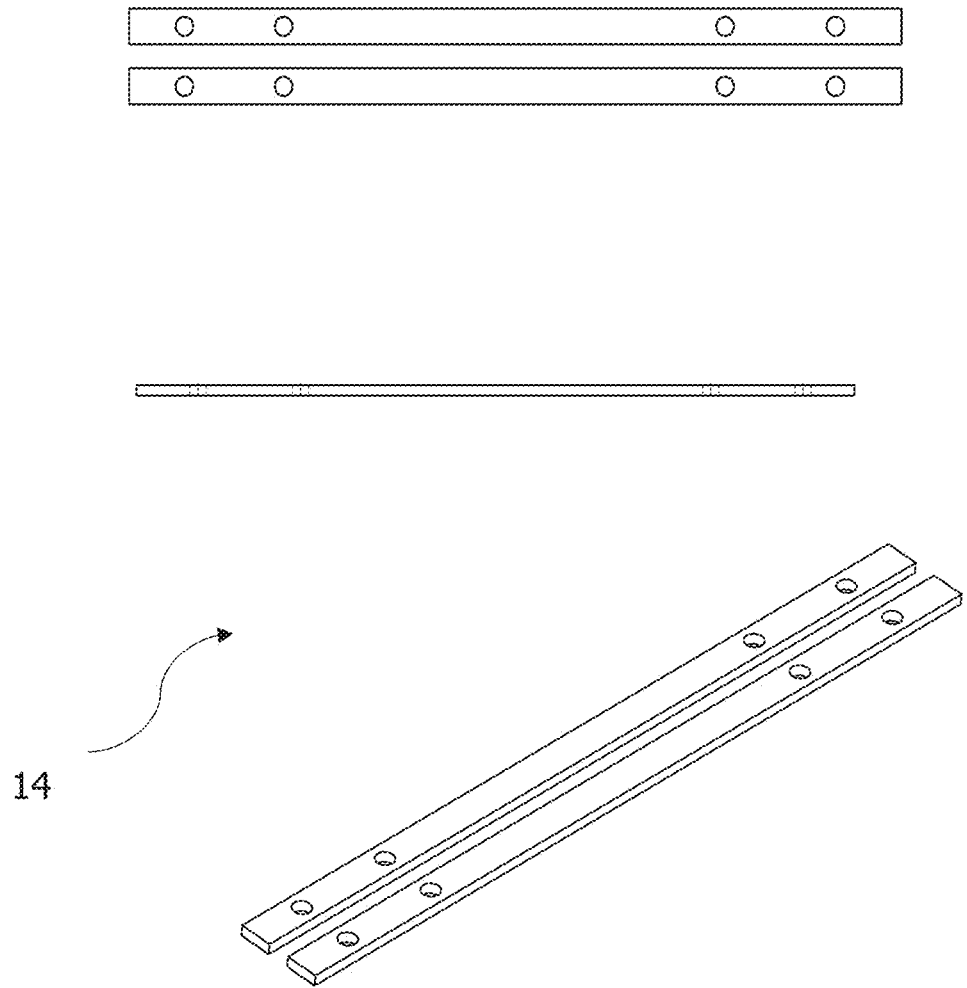
FIG. 11 shows leaf springs of a compliant element in accordance with another embodiment of the present invention.

Referring to FIG. 4, the brake pedal (10) may be in mechanical communication with the master cylinder of a conventional hydraulic braking system. Thick lines denote mechanical coupling, while thin lines represent signals in the mentioned diagram above. Accordingly, the pedal displacement is continually measured and mapped to the desired deceleration. Due to the measurement of the pedal displacement, the force-feedback brake pedal system may further comprise a position sensor for sensing the brake pedal displacements. Given the desired vehicle deceleration, the brake force distribution block considers the instantaneous regenerative braking capacity, as well as the road conditions to generate the brake force references for both the regenerative and the friction braking systems.

In another exemplary embodiment, the force-feedback brake pedal system (100) has at least two sensors so that motor position and deflection of the elastic element pedal position can be estimated. The force-feedback brake pedal system (100) has at least two sensors which measure pedal position, motor position or elastic element deflection. To operate the system, two of this three measurements is enough. Moreover, any more than two sensors is redundant. Redundancy is fine for safety.

In an exemplary embodiment, the brake pedal (10) is actuated by brushless DC motor (25) which is equipped with an optical encoder (45) which has a 1 Nm continuous torque output. A planetary gear train with 10:1 reduction ratio is coupled to the DC motor (25). A geared motor is used to drive the sector pulley (30) of a capstan transmission (150) mechanism that provides a second level of 4:1 reduction. The sector pulley (30) is attached to brake pedal through a leaf spring (14) based cross flexure joint (90) that serves as a robust and simple compliant element (250) with a large deflection range. A Hall effect sensor (35) and a linear encoder (22) are used for measuring the deflection of the cross-flexure joint (90). The force-feedback brake pedal system (100) can provide over 160 N continuous and 500 N peak pedal forces to the human foot. Furthermore, thanks to low transmission ratio employed at the first level and the use of virtually frictionless capstan transmission (150) at the second level, the system is passively back drivable by a human foot, which ensures that a driver can override the system to control friction brakes.

According to a possible embodiment of the present invention, cascaded controllers are implemented for the force-feedback brake pedal. The cascaded controller may consist of an inner motion control loop and an outer force control loop. The inner loop of the control structure uses a robust motion controller to compensate for the imperfections of the power transmission system, such as friction or stiction, rendering the motion controlled system into an ideal motion source within its control bandwidth. This motion controller is implemented at the highest possible control rate. The outer control loop may incorporate force feedback into the control architecture at 1 kHz and ensure good force tracking performance under adequately designed inner loop.

Various math functions can be chosen for describing the pedal feeling and the behaviours of the force feedback and deceleration needed, depending on brake pedal (10) displacement so as to be recovered conventional brake pedal feel needs under the intervention of regenerative braking.

In accordance with another aspect of the present invention, as shown in FIG. 4, after appropriate scaling, the regenerative force brake demand is passed to the force-feedback brake pedal system (100) as a reference force. The force-feedback brake pedal system (100) relies on closed-loop force control to ensure that this reference force is rendered to the driver with high fidelity. Consequently, the driver feels the force feedback from the total braking force applied to the vehicle, that is, the sum of forces from the friction brakes through mechanical coupling and regenerative brakes through brake pedal (10).

Integration of the said force-feedback brake pedal system having series elastic actuator in a physical vehicle with various electrical vehicles such as bicycles or motorcycles is available, hence this implementation presents serviceable tools or vehicles.

Exemplary Experimental Work for Proof of Concept

The experimental evaluation of invention is fulfilled and performance of force-feedback brake pedal system (100) is evaluated.

In a sample implementation, the conventional brake pedal feel that needs to be recovered under the intervention of regenerative braking is mathematically modelled as:

$$F_{pedal}[N] = \begin{cases} 0.80\ x_{pedal} + 18.17 & x_{pedal} \leq 20\ mm \\ 3.92\ x_{pedal} & 20\ mm < x_{pedal} \leq 80\ mm \end{cases}$$

where x pedal denotes the pedal displacement that has a maximum stroke of 80 mm and F pedal is the total force pedal acting on the driver.

Within the context of this exemplary, the brake pedal displacement x pedal is mapped to the deceleration demand $a^d_{car}$ according to following function;

$$a^d_{car}\left[\ \right] = -\begin{cases} -(0.01\ x_{pedal})g & x_{pedal} \leq 20\ mm \\ (0.02\ x_{pedal} - 0.2)g & 20\ mm < x_{pedal} \leq 80\ mm \end{cases}$$

where g represent gravitational acceleration in m/sec$^2$.

In all of the graph, it is possible to find out three main sections:

idle: is first part of the graph till 20/25 mm of pedal travel: in this part, the pedal feeling are "soft", both in terms of force feedback and deceleration needed;

dosing/normal: is the central part starting from 20/25 mm of pedal travel: in this part the behaviour of the pedal feelings starts to be stronger. It is very common to perform brake action in this section;

fading: it is the final part in which the pedal feelings become even more hard. It is uncommon to be in this section, except for the race scenario or following several consecutive emergency braking.

Brake force distribution is decided based on the deceleration demand from the driver, instantaneous vehicle speed, battery charge level and the road conditions. A simple model of instantaneous regenerative braking force is employed as $F_{reg}=P_{in}/v_{car}$, where P denotes the constant braking power of the electric motor, and $v_{car}$ is the instantaneous velocity of the vehicle. Given the regenerative braking capacity at any instant and neglecting the road conditions for simplicity, the brake force distribution block determines the amount of regenerative and friction braking that needs to be employed.

Thanks to its high-fidelity force control performance, the force-feedback pedal system (100) not only can be used to compensate for the parasitic effects of regenerative braking on the natural pedal feel, but also can provide adjustable brake pedal feel for different vehicle settings in electrical and hybrid vehicles.

The force-feedback brake pedal system according to the present invention may further comprise a torque controlled test dynamometer for simulating the force feedback from a frictional braking system. This allows the invention be implemented as a simulator of a cooperative braking system.

Advantageously, the pedal force feedback can be adjusted to match different vehicle modes (e.g., sport or comfort), as commonly implemented for steering, throttle and suspension responses. The main actuation mechanism and dimensions of the SEA brake pedal have been designed to be compatible with existing brake pedals (10), such that force-feedback brake pedal system (100) can be connected to existing friction brakes in parallel with minimal modifications. The brake pedal system (100) can be used in vehicles having brake-by-wire functionality.

What is claimed is:

1. A force-feedback brake pedal system for braking of an electric or hybrid vehicle, wherein the electric or hybrid vehicle jointly comprises a regenerative braking system and a frictional braking system, wherein the force-feedback brake pedal system comprises:

a brake pedal pivotally mounted around a shaft or a bearing, an electronic circuitry in an electrical communication with the regenerative braking system and the frictional braking system of the electric or hybrid vehicle, an actuator for providing a force feedback in accordance with a regenerative braking and a friction braking of the electric or hybrid vehicle, the actuator is in a mechanical communication with the brake pedal, wherein, the force-feedback brake pedal system further comprises:

a compliant element arranged between the brake pedal and the actuator, wherein the compliant element is in series with the actuator, the compliant element comprising a first end having a pulley, a capstan, or a gear, and the compliant element comprising a second end, and a linear sensor, or a rotary displacement sensor, or a deflection sensor measuring deflections of the compliant element and transmitting data to the electronic circuitry, during an operation, wherein the first end of the compliant element is attached to an output shaft of a reduction mechanism via the pulley, the capstan or the gear, and the second end is fixedly attached to the brake pedal.

2. The force-feedback brake pedal system according to claim 1, wherein the compliant element is in series with the actuator.

3. The force-feedback brake pedal system according to claim 1, wherein the force-feedback brake pedal system further comprises a position sensor or a rotation sensor for sensing a position of the actuator.

4. The force-feedback brake pedal system according to claim 1, wherein the deflection sensor is a linear encoder or a hall-effect sensor for sensing the deflections of the compliant element.

5. The force-feedback brake pedal system according to claim 1, wherein the actuator is a rotary electric motor having a primary rotation X-axis.

6. The force-feedback brake pedal system according to claim 5, wherein the reduction mechanism is configured for adjusting a rotation speed or a output torque of the rotary electric motor around the primary rotation X-axis.

7. The force-feedback brake pedal system according to claim 1, wherein the force-feedback brake pedal system comprises the linear sensor, or the rotary displacement sensor for sensing brake pedal displacements.

8. The force-feedback brake pedal system according to claim 1, wherein the brake pedal is in the mechanical communication with a master cylinder of the frictional braking system.

9. The force-feedback brake pedal system according to claim 8, wherein the force-feedback brake pedal system comprises measuring a force received from the master cylinder for sensing the force received from the master cylinder of the frictional braking system.

10. An electric or hybrid vehicle, comprising the force-feedback brake pedal system according to claim 1.

* * * * *